United States Patent Office 3,423,223
Patented Jan. 21, 1969

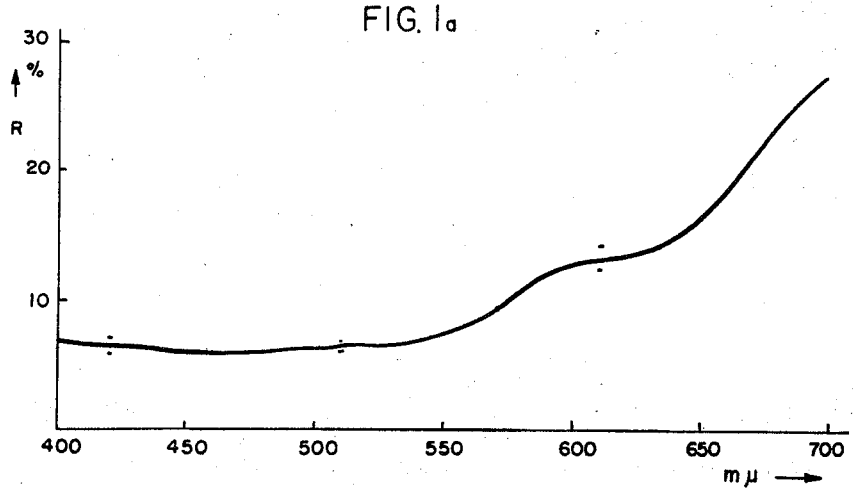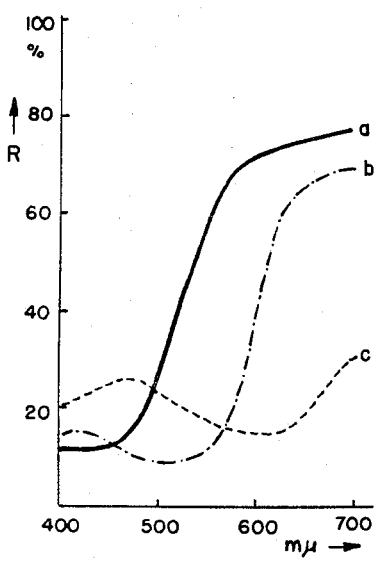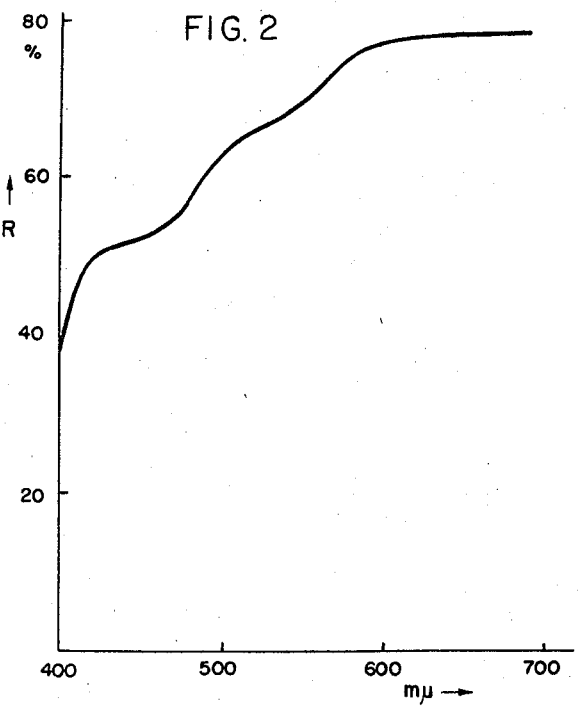

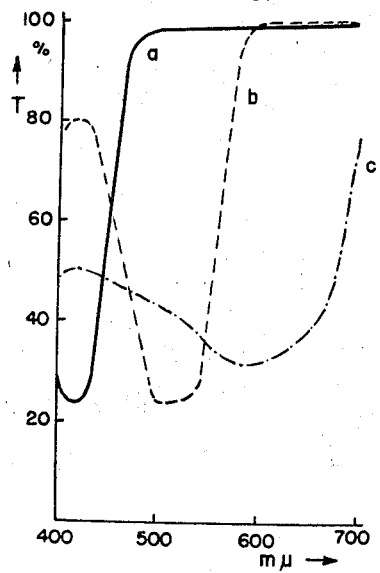
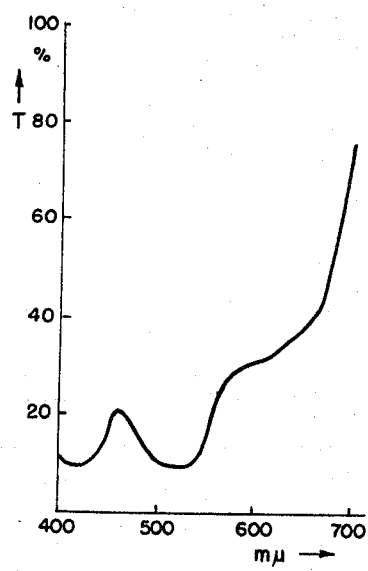
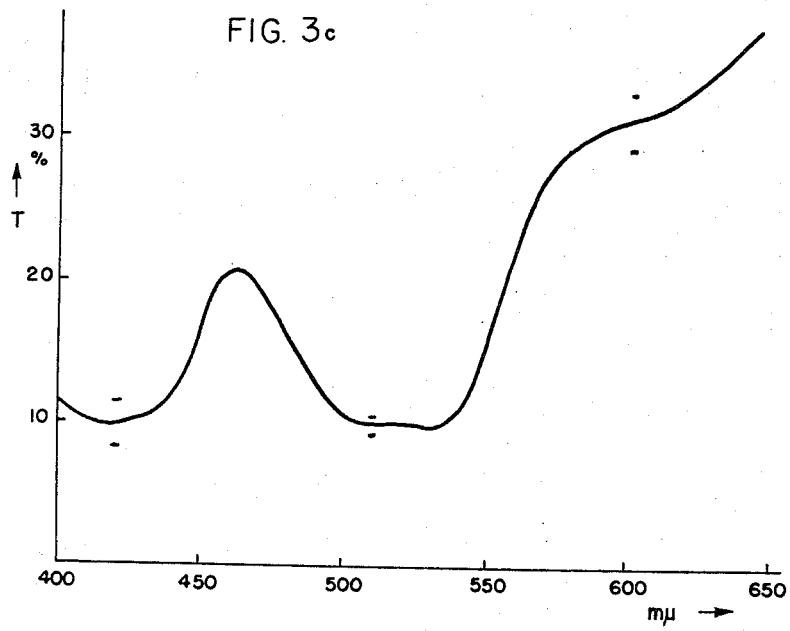

3,423,223
METHOD OF KEEPING COLOR DEVIATIONS WITHIN TOLERANCE LIMITS
Werner Schultze, Ludwigshafen (Rhine), Germany, assignor to Badische Anilin- & Soda-Fabrik, Aktiengesellschaft, Ludwigshafen (Rhine), Germany
Filed June 11, 1965, Ser. No. 463,214
Claims priority, application Germany, June 11, 1964, B 77,241; Apr. 12, 1965, B 81,430
U.S. Cl. 106—287    5 Claims
Int. Cl. C09c 1/00

ABSTRACT OF THE DISCLOSURE

Color control processes to maintain color control in reference to permissible tolerances from the standard color of a mixture of a plurality of colorants by utilization of spectral transmission or spectral reflection measurements at wave lengths corresponding substantially to maximum absorption of each colorant to determine whether the color of the tested sample is within predetermined tolerance limits with respect to said standard color, said tolerance limits being predetermined empirically or by computation with reference to samples wherein each individual colorant is added to or subtracted from the standard color.

---

Figure 4:
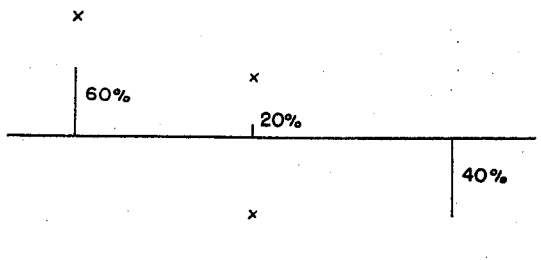

The invention relates to a method of keeping color deviations within tolerance limits by reference to tolerance marks above and below the spectral reflection or transmission curve of the color it is desired to maintain.

When a material of some particular kind, such as a textile, paper, leather, plastic material and the like, is dyed or printed upon or when dyes, pigments, lacquers, paints, printing inks, colored glasses, sheeting and so forth are being produced, it is often desired that the color shall not be allowed to deviate from a specified shade. For instance, the problem may be that of preventing the color from gradually changing in the course of a continuous process of dyeing or printing. In other cases the problem may be that of ensuring that the shade of color of a particular dye is reproducible so that when the dye is repeatedly prepared subsequent batches completely match the original shade. Similar problems arise in processing techniques for instance in multi-color printing or color photography.

In the majority of cases the assessment whether or not the shade of a particular color has been maintained is left to skilled persons who make visual comparisons. No difficulties naturally arise if the color deviations are small enough to remain imperceptible to the eye. However, generally speaking, the maker of a colored product or colorant cannot be expected to keep variations within such very fine limits because the technological complications and the cost would be prohibitive. In practice certain tolerance limits are accepted as being admissible and these depend upon the envisaged application and manufacturing conditions. However, a tolerance range is difficult to assess by visual assessment and in production control as well as in the relations between maker and consumer differences of opinion as to the admissibility of a particular deviation often occur.

At present the following methods are used for determining tolerance limits by an *objective* test.

(1) The characterization of tolerance limits in a colorimetric system, preferably in the C.I.E. system.
(2) The numerical determination of the admissible deviation by one of the formulae for evaluating the perceptual size of a color difference.

Tolerance limits are also determined by using limit samples, comparison being by visual match.

In the latter method a number of limit samples are produced and a visual assessment is then made whether the color that is to be tested is within or outside the limit samples. This method has several drawbacks. Although it facilitates visual assessment differences of opinion can nevertheless still arise, particularly if the deviation is not clearly in the direction towards one of the limit samples. Moreover, a sufficient number of limit samples must be provided, for instance in six different directions. Moreover, the preparation of such limit samples takes considerable time because several samples must first be prepared in each direction of deviation and the particular samples which just represent the admissible deviation must then be selected. Thirdly, the limit samples and the type that must be maintained will not generally keep for an unlimited period of time.

The first method involves as many or even more preliminary tests than this latter procedure. Its application is therefore not worthwhile unless only a relatively small number of colors is determined for a longer period of time, for instance in the form of reference standards, as is done for instance in the case of traffic signals (cf. German Industrial Standards DIN 6163). Color measurements thus determine whether the tested color is within the tolerance limits.

The second method is at present the most widely used. The standard and the color that is to be tested are submitted to a colorimetric measurement and the perceptual size of the color difference is evaluated. These evaluations of color differences are not performed according to unified principles, different formulae and charts being used. One of the most reliable and frequently employed methods of determining color difference is that proposed by MacAdam. He found that the loci of colors evenly spaced from a given color are ellipses in the chromaticity diagram. In the charts of Simon and Goodwin (F. T. Simon and W. J. Goodwin "Rapid Graphical Computation of Small Color Differences"; American Dyestuff Reporter 47, 105–112 (1958)) MacAdam's results are used and their practical application facilitated. By reference to the measured color components $x$ and $y$ of the standard and of the deviating color, the relative area in the chromaticity diagram is first found, and the $x$ and $y$ values of both colors are then plotted in the diagram and the spacing of both colors from a given lightness level is thus ascertained. Another series of diagrams is provided for the different lightness ranges. By reference to the likewise determined Y values (lightness reference value) of both colors the relevant lightness diagram is selected. The previously determined spacing is plotted therein, the two Y values being taken into account, and the final perceptual size of the color difference is thus obtained.

If this value, ascertained by the described or some other method of assessing color difference, is less or equal to the previously fixed tolerance limit, then the deviation is still admissible, if it is greater, then the color requires correction. However, the accuracy of the formulae for evaluating the perceptual size of color differences must not be overestimated. Also, it is advisable to set slightly different tolerance limits for colors that are widely apart, say ivory and a deep red. Nevertheless, for an objective assessment of color difference the method is useful in principle. However, it has the drawback that *each* test involves a very considerable amount of work.

The primaries X, Y, Z can be provided directly and quickly only by expensive and complicated colorimetric instruments, such as the recording spectral photometer made by General Electric. In the cheaper and more robust instrument based on the tristimulus method a computation must be made after the measurement. From the X, Y, Z values of the tested color and of the standard, the perceptual size of the difference is calculated by a lengthy calculation that is not quite simple. The determination via diagrams also requires time and considerable attention and care. Apart from the time factor, the making of such evaluations can be entrusted only to intelligent and skilled personnel. Consequently this method is generally used only for occasional checks or in particularly important cases and not for constant control of production, even if suitable colorimetric instrumentation is actually available.

It has also been repeatedly proposed to make use of the spectral transmission or reflection curve of the standard color for the purposes of control, a tolerance range being fixed by drawing parallel lines above and below the curve. However, practice has shown that such a method gives rise to too many errors and in Example 1 it will be shown how far the results obtained by this method can deviate from the facts.

It is the object of the present invention to provide a method which permits tolerance limits to be maintained in a simple way and with a sufficient degree of precision.

I have found that color differences can be rapidly determined in a manner that is sufficiently accurate for practical purposes in the case of mixtures containing several colorants and that a correction can thus be quickly effected if tolerance marks that must not be exceeded are fixed in several spectral regions above and below the curve of spectral reflection or transmission of the color that is to be maintained, the spectral regions being selected for each colorant to contain the region of maximum or substantially maximum absorption of the colorant and the upper and lower tolerance marks being determined by reducing or raising the concentration of each colorant until the admissible color difference has been reached, and by the degrees of reflection and transmission of these admissible color differences in the relevant selected spectral regions, the relative proportions of the colorants being thereafter corrected, possibly automatically, whenever one of the tolerance marks is exceeded.

Although the determination of these marks calls for some preparatory work, the subsequent continuous check is extremely easy to perform and can be carried out quickly even by unskilled personnel. Moreover, there is no difficulty in providing the measuring instruments with signalling equipment or control means for correcting the color which are activated when the marks are reached.

In a preferred embodiment of the invention the number of the marks that are determined depends upon the number of colorants (dyes or pigments) in the mixture. For instance, if three different dyes are used for the production of a standard dye, then 3 marks are fixed above and 3 below the spectral curve, whereas in the case of 4 dyes 4 marks are fixed above and 4 below and so forth. The most convenient procedure is to determine the marks in those points of the spectrum in which the respective dyes have their absorption maximum. However, more or fewer tolerance marks than correspond to the number of mixture components may be thus fixed.

For instance, in the simultaneous presence of a brilliant yellow and a brilliant red dye, an additional pair of tolerance marks is preferably fixed in a spectral region intermediate between that of the yellow and that of the red dye, the distance of these marks from the spectral curve of the standard color being determined by simultaneously changing the concentrations of the yellow and the red dye.

The preliminary work required for fixing the tolerance marks may be empirical or it may be done by computation. Both procedures will be hereinafter described. Which method should be adopted depends upon the individual case. The empirical method calls for the preparation of a number of sample dyeings in which the concentrations are varied in relation to the standard color. Care must be taken to keep dyeing conditions constant. The computational method is based upon the validity of Beer's Law for transparent colors and of the Kubelka-Munk function for opaque colors. It is known that particularly the latter is not very exact for wide concentration ranges. However, only small differences in concentration are involved here so that, generally speaking, its validity can be accepted.

It is common to both methods, the empirical as well as the computational, that the first lower and upper marks are first determined by changing the concentration of one component colorant, then the second by changing the concentration of the second component and so forth. Assuming the standard color is that of a mixture containing a yellow, a red and a blue dye, then the concentration of say the yellow component is first reduced until the vicinity of the envisaged tolerance mark is roughly reached. The perceptual size of the difference between this modified color and the standard color is then determined and by inter- or extrapolation the concentration change required for attaining the color difference corresponding to the envisaged tolerance limit fixed. At the same time the reflection or transmission of the modified color is determined for that particular wavelength in which the yellow has its absorption maximum. One of the tolerance marks above the curve of the standard color is thus obtained. The corresponding mark below the curve is readily fixed because the appropriate increase in concentration may be taken as corresponding to the previous reduction in concentration, possibly after some correction. This procedure is repeated by then varying the concentration of only the red and finally of the blue dye.

In the described mixture of a yellow, a red and a blue dye the absorption maxima of the three dyes are widely separated in the spectrum, namely in the violet or blue, in the green and in the red region. However, frequently two colored components and one gray or nearly gray component are mixed. In such a case it may be found that the absorption maximum of the gray is near the absorption maximum of one of the colored components. In such a case it is advisable to fix the tolerance mark for the gray for a more remote wave length, even if its absorption in this region is somewhat less. For instance, in a mixture of yellow, red and gray the absorption maximum of the yellow is in the blue violet, that of the red in the green. For the gray a wave length may then be selected in the orange red to red spectral region.

In the event of a supplementary pair of marks being provided the simplest procedure in practice is to select a wave length for the supplementary pair as nearly as possible halfway between the two pairs of marks for the yellow and the red dye. For determining the color difference it is sufficiently accurate to determine the required reduction in concentration for reaching the predetermined difference value. The upper mark is thus directly found and the bottom mark can be fixed by raising the concentration by a like amount. It is also useful, when simultaneously varying the concentrations of yellow and red, to start from the concentration changes that have been obtained in the determination of the pairs of marks relating to the yellow and the red, respectively. However, instead of immediately making the full concentration change, one amounting to between 70 and 80% thereof is to be preferred. The final determination is then by inter- or extrapolation.

Example 1

A woollen fabric is dyed with a mixture containing the three dyes ®Ortolan Yellow G, Ortolan Red G and Ortolan Blue G. If the concentration of all three dyes is 0.5 g./100 cc. of the liquor a dark brown dyeing results. The spectral reflection curve of this color is illustrated in FIGURE 1a (R=reflection). This is the standard reference color in the present example. When these dyes were used on wool it had been found that the simple Kubelka-Munk relation $$K/S = \frac{(1-R_\infty)^2}{2R_\infty}$$

approximately holds within a wide range. In this equation K is the coefficient of absorption, S the coefficient of dispersion, R the reflectance. The index ∞ means that during the measurement the base is completely obscured by the sample. It had also been ascertained that the $K/S$ functions could be regarded as additive in color mixtures of these dyes within a wide range (in analogy to the additiveness of the optical density in Lambert-Beer's Law). It is therefore entirely justified to assume the $K/S$ as being additive within the narrow regions here contemplated. The determination of the tolerance marks in the present instance can therefore be done by computation. For this purpose the reflection curves of the three individual dyes are required in the concentration of 0.5 g./100 cc. selected for each dye in the present example (FIG. 1b; R=reflexion; a is the curve of Ortolan Yellow, b that of Ortolan Red and c that of Ortolan Blue). Within the interval from 400 to 700 m$\mu$ the reflectances and the associated $K/S$ values are ascertained in steps from 10 to 10 m$\mu$. (This preparatory work must in any event be done in connection with the preliminary calculations for the required recipe of these dyes and can then be used for the determination of tolerance marks for all other combinations of these dyes.) In the case of the standard color here chosen the values are taken from their spectral reflection curves at the same wave lengths and the corresponding $K/S$ values looked up in the available tables.

In order to find the first tolerance mark the concentration of the yellow dye is first reduced by 0.1 g./100 cc. To this end the $K/S$ values of the yellow dye are divided by 5 and deducted from the $K/S$ values of the standard color for each wave length. The resultant $K/S$ values are then reconverted into the reflectances R. In the usual manner the primaries X, Y, Z are determined from the R values of the standard color and from the color reduced by 0.1 g. of yellow. The perceptual size of the color difference is calculated according to Simon and Goodwin. In the present instance it is found to be $\Delta A$ (also called $\Delta E$) =2.3 units. The color difference between the tolerance mark and the standard color is to be 3 units (this is decided according to the required admissible deviation). The concentration can therefore be still further lowered. By extrapolation it is found that the concentration of the yellow can in fact be reduced to 0.13 g. before the perceptual size of the difference $\Delta A$ is 3 units. The first tolerance mark is preferably located at the reflexion minimum of the yellow dye, namely at 420 m$\mu$. The $K/S$ value of 0.13 g. of yellow at this wave length need therefore merely be deducted from the $K/S$ value of the standard color and the difference reconverted into R. It is found that at 420 m$\mu$ the reflectance of the standard color is 6.2% and that of the mixture reduced by 0.13 g. of 7.0%. This then is the first tolerance mark.

For fixing the second tolerance mark the concentration of the red in the standard color is reduced by 0.05 g. The difference between the new color and the standard color is $\Delta A$=2.95. This value happens to be so close to the desired difference of 3.0 that no further correction is needed. The second tolerance mark is located at the wave length

---

®=registered trademark.

of 510 m$\mu$ and corresponds to a reflectance of 6.6% compared with 6.2% of the standard color.

For finding the third tolerance mark the concentration of the blue is reduced by 0.05 g. The difference from the standard color is found to be $\Delta A$=2.85. This requires a slight correction. The third tolerance mark is located at 610 m$\mu$ and corresponds to a reflectance of 14.3% compared with 13.3% of the standard color.

The tolerance marks in the opposite direction are found by taking the reductions in concentration that produce a difference of $\Delta A$=3 and increasing the concentration by the corresponding amount. In other words, in the three selected wave lengths the $K/S$ values need merely be added instead of subtracted and the $K/S$ then converted to R.

The six tolerance marks thus determined are plotted in FIG. 1a above and below the curve for the standard color.

It will now be shown that the tolerance marks make sense not only for concentration changes of one of the dyes but also for simultaneous changes in concentration of two or three dyes. It will be understood that the following calculations (or experiments) are not needed for actually finding the tolerance marks and that they are merely here carried out for the purpose of checking the method according to the present invention.

First and foremost let us consider the case of the concentrations of both yellow and red being reduced, that of the blue remaining unchanged. The greatest deviation from the standard color must clearly be expected to occur when the tolerance marks that apply to these dyes, i.e. the tolerance marks at 420 m$\mu$ and at 510 m$\mu$, have both just been reached. Now, although the absorption maximum of yellow is at 420 m$\mu$, its absorption at 510 m$\mu$ is by no means negligible, and whereas the absorption maximum of red is at 510 m$\mu$ it also perceptibly absorbs at 420 m$\mu$. Consequently when both marks are reached the fall in concentration of both dyes will not be as great as when only one mark is reached by a fall in concentration of only one of the dyes. The fall in concentration of both dyes $\Delta c_{yel.}$ and $\Delta c_{red}$ can be calculated as follows:

Since the $K/S$ values are proportional to the concentration at all wave lengths the following proportions apply $$\frac{\Delta(K/S)_{yel.,420}}{(K/S)_{yel.,420}} = \frac{\Delta(K/S)_{yel.,510}}{(K/S)_{yel.,510}} = \frac{\Delta c_{yel.}}{0.5}$$

where the $(K/S)_{yel.\ 420}$ and $(K/S)_{yel.\ 510}$ values apply to a concentration of 0.5 g./l. of the yellow as used in this example. Corresponding proportions hold for the red.

The increase of $K/S$ to the mark is thus known from the above equations. The total increase of the $K/S$ is additively composed of the yellow and red components. In other words we have $$\Delta(K/S)_{tot.,\ 420} = \Delta(K/S)_{yel.,\ 420} + \Delta(K/S)_{red,\ 420}$$

and $$\Delta(K/S)_{tot.,\ 510} = \Delta(K/S)_{yel.,\ 510} + \Delta(K/S)_{red,\ 510}$$

By substituting $$\Delta(K/S)_{yel.,\ 420} = \frac{(K/S)_{yel.,\ 420}\Delta c_{yel.}}{0.5}$$

etc. these equations can be written $$\Delta(K/S)_{tot.,\ 420} = \frac{(K/S)_{yel.,\ 420}\Delta c_{yel.}}{0.5} + \frac{(K/S)_{red,\ 420}\Delta c_{red}}{0.5}$$

$$\Delta(K/S)_{tot.,\ 510} = \frac{(K/S)_{yel.,\ 510}\Delta c_{red}}{0.5} + \frac{(K/S)_{red,\ 510}\Delta c_{red}}{0.5}$$

From these two equations $\Delta c_{yel.}$ and $\Delta c_{red}$, being the only unknown quantities, can be calculated. It is found that the decrease in concentration of yellow would be 0.104 and that of red 0.037. The further procedure is now analogous to that for determining the tolerance marks, except that the values resulting from the change of both yellow *and* red are deducted from the K/S valuse of the standard color. Finally the spacing of this modified color from the standard color is ascertained. In analogous manner the calculation is carried out for the cases in which the concentrations of yellow and blue or of red and blue are reduced until the marks are reached. Finally a calculation is made in respect of the case that a reduction in concentration of yellow, red and blue leads to all three tolerance marks being reached. In the latter case three equations with three unknown quantities must naturally be solved instead of only two equations with two variables as above. In conclusion, a similar calculation is made in the same way for increases in concentrations in each one of the above cases.

The results of the color difference evaluations are compiled in the following table.

| No. | Change of color due to— | Tolerance mark reached at— | ΔA |
|---|---|---|---|
| 1 | Reduction of yellow | 420 mμ (up) | 3.1 |
| 2 | Reduction of red | 510 mμ (up) | 3.0 |
| 3 | Reduction of blue | 610 mμ (up) | 3.1 |
| 4 | Reduction of yellow and red | 420 and 510 mμ (up) | 3.4 |
| 5 | Reduction of yellow and blue | 420 and 610 mμ (up) | 3.3 |
| 6 | Reduction of red and blue | 510 and 610 mμ (up) | 3.0 |
| 7 | Reduction of yellow, blue and red. | 420, 510 and 610 mμ (up). | 3.0 |
| 8 | Increase of yellow | 420 mμ (down) | 2.8 |
| 9 | Increase of red | 510 mμ (down) | 2.8 |
| 10 | Increase of blue | 610 mμ (down) | 2.8 |
| 11 | Increase of yellow and red | 420 and 510 mμ (down) | 3.1 |
| 12 | Increase of yellow and blue | 420 and 610 mμ (down) | 2.9 |
| 13 | Increase of red and blue | 510 and 610 mμ (down) | 2.9 |
| 14 | Increase of yellow, red and blue. | 420, 510 and 610 mμ (down). | 2.8 |

It will be gathered from this table that although the ΔA values are not exactly 3.0 they nevertheless deviate upwards and downwards from the desired difference value very little.

By way of comparison it will now be shown that a displacement of the reflection curve parallel to itself to define a tolerance limit does not achieve a like favourable result. If the curve were to be displaced to the nearest tolerance mark, namely to that at 510 mμ, it will be at once seen that at 420 mμ and at 610 mμ this curve would be well inside the tolerance marks. This means that the parallel tolerance curve would already be reached by substantially smaller reductions in concentration of only the yellow or only the blue than in the present example and that corrective action would therefore be taken at color differences that are far too small. On the other hand, if the standard curve were displaced to the tolerance mark that is furthest away, namely to that at 610 mμ, then the resultant differences would be too great when the concentration of only the yellow or only the red was reduced. In the latter case a particularly unfavourable result would have to be expected. A calculation was therefore made and the perceptual size of the color difference was found to be $\Delta A = 7.4$.

Example 2

Polystyrene is dyed an ivory color and processed by injection molding. 4 pigments were mixed with the polystyrene, namely 12 g. of titanium oxide RN 56, 0.10 g. of cadmium yellow 6 GN, 0.036 g. of vulcan red MO and 0.0035 g. of carbon black per kg. of polystyrene.

In its rutile modification titanium oxide has a strong absorption band at the extreme short wave end of the visible spectrum, but this has no major effect on the color. The major function of the titanium dioxide is to disperse the light to make the material opaque. Any minor fluctuations of the titanium dioxide content or of its grain size are therefore of no significant effect upon color adjustment. The procedure was therefore the same as that normally employed in calculating color composition, polystyrene and titanium dioxide being regarded as a white opaque matrix material and the three other pigments as variable colorants.

The reflection curve of the ivory standard color is shown in FIG. 2 (R=reflection). For the tolerance marks the following wave lengths were selected: 440 mμ for yellow, 520 mμ for red and 640 mμ for black. In this instance the position of the marks was determined empirically. The concentration of only the yellow was first reduced, then that of the red alone and finally that of the gray. The reflection curves of the polystyrene colors thus obtained were measured and the color differences calculated according to Simon and Goodwin's method by making use of the primary color values X, Y and Z.

| | Difference from the Standard Color ΔA |
|---|---|
| Reduction in concentration of the yellow by 0.03 g | 3.0 |
| Reduction in concentration of the red by 0.007 g | 3.2 |
| Reduction in concentration of the black by 0.0010 g | 2.9 |

The difference between the color containing less yellow and the standard color was 2.1% in reflection at 440 mμ, that of the color containing less red 1.8% at 520 mμ and that of the color containing less black 2.7% at 640 mμ. (Since the ΔA value was sufficiently close to the required value of 3.0 no further inter- or extrapolation was thought to be necessary.)

The tolerance marks were therefore determined purely experimentally. For comparison purposes the tolerance marks for reductions of concentration were also determined by calculation as described in Example 1, the K/S values being derived from the reflection curves of the several pigments and subtracted from the K/S values of the standard color.

This gave the following tolerance marks:

Mμ: Percent
440 _____ 2.3
520 _____ 1.9
640 _____ 2.9

The result is therefore substantially the same and confirms that the empirical method or the method by calculation can be chosen.

In this example the method was also checked for cases in which two or all three marks are reached at the same time, although in practice such a check would not be needed. It would be rather complicated experimentally to achieve color changes satisfying these particular conditions. These cases were therefore tackled by calculation and the results are compiled in the following table:

| Color change due to— | Tolerance mark(s) reached at— | ΔA |
|---|---|---|
| Reduction of yellow | 440 mμ | 3.0 |
| Reduction of red | 520 mμ | 2.9 |
| Reduction of black | 640 mμ | 3.0 |
| Reduction of yellow and red | 440 and 520 mμ | 3.3 |
| Reduction of yellow and black | 440 and 640 mμ | 3.0 |
| Reduction of red and black | 520 and 640 mμ | 3.0 |
| Reduction of yellow, red and black | 440, 520 and 640 mμ | 3.0 |

The ΔA values are thus very close to the required value of 3.0.

Example 3

For this example transparent colors were used. In practice these are of importance for sheeting, glass, clear lacquer coatings, transparent plastics, photographic film, optical filters and so forth. The sample used was a colored solution because different concentrations can be particularly easily and accurately adjusted in a solution. From the dyes which dissolve readily in water the acid dyes quinoline yellow extra, Anthosin 3B and Ortolan Gray BG were selected. FIGURE 3a (T=transmission; *a* is the curve of quinoline yellow extra, *b* that of Anthosin 3B and *c* that of Ortolan Gray BG) shows the transmission curves of these dyes at concentrations of 10 mg./l. of the quinoline yellow extra, 7.5 mg./l. of the Anthosin 3B and 50 mg./l. of the Ortolan Gray BG in a layer of 2 cm.

thickness. In the case of the colored dyes the transmission minima are most suitable for locating the tolerance marks. These are at 420 m$\mu$ for the quinoline yellow and at 510 m$\mu$ for the Anthosin. For the Ortolan Gray a wave length of 600 m$\mu$ was chosen. This is not exactly at a minimum but slightly displaced towards the longer wave region in which the other dyes have the lowest absorption.

The standard reference color was a mixture of the three dyes in the above concentrations in a layer of 2 cm. thickness. Their spectral transmission curves are shown in FIGURES 3b (T=transmission). FIGURE 3c (T=transmission) is a considerable enlargement of the important part of the curve with the tolerance marks which were determined by calculation in the manner described in Example 1. However, since these are transparent colors Beer's Law must be applied instead of the Kubelka-Munk relationship. Consequently, instead of K/S values the values of optical density D must be added or subtracted. This is related to the transmittance by the relationship $D = \log 1/\tau$.

In the same ways as in the preceding examples the cases in which two or three tolerance marks were simultaneously reached were also specially calculated. The result of the calculation is compiled in the following table.

| No. | Color change due to— | Tolerance mark(s) reached at— | $\Delta A$ |
|---|---|---|---|
| 1 | Reduction of yellow | 420 m$\mu$ (up) | 3.1 |
| 2 | Reduction of purple | 510 m$\mu$ (up) | 3.0 |
| 3 | Reduction of gray | 600 m$\mu$ (up) | 3.0 |
| 4 | Reduction of yellow and purple. | 420 and 510 m$\mu$ (up) | 4.1 |
| 5 | Reduction of yellow and gray. | 420 and 600 m$\mu$ (up) | 3.4 |
| 6 | Reduction of purple and gray. | 510 and 600 m$\mu$ (up) | 3.6 |
| 7 | Reduction of yellow, purple and gray. | 420, 510 and 600 m$\mu$ (up) | 3.7 |
| 8 | Increase of yellow | 420 m$\mu$ (down) | 2.7 |
| 9 | Increase of purple | 510 m$\mu$ (down) | 3.0 |
| 10 | Increase of gray | 600 m$\mu$ (down) | 3.0 |
| 11 | Increase of yellow and purple. | 420 and 510 m$\mu$ (down) | 4.2 |
| 12 | Increase of yellow and gray. | 420 and 600 m$\mu$ (down) | 3.3 |
| 13 | Increase of purple and gray. | 510 and 600 m$\mu$ (down) | 3.5 |
| 14 | Increase of yellow, purple and gray. | 420, 510 and 600 m$\mu$ (down) | 3.7 |

In this example some of the $\Delta A$ values are a little further removed from the required value of 3.0 than in the two preceding examples. This is due to the fact that two very clear and brilliant dyes were used for the yellow and purple. However, it must be borne in mind that the largest $\Delta A$ values of 4.1 and 4.2 occur only in the practically very rare case of the two brilliant dyes both reaching the marks at 420 and 510 m$\mu$ by concentration changes at the same time.

If it is desired definitely to avoid the required $\Delta A$ value being considerably exceeded, the tolerance marks may be determined for a slightly lower value of $\Delta A$, for instance for $\Delta A = 2.4$, whenever such very brilliant dyes are used.

However, this is not an altogether advisable procedure because color differences which are as such still within the tolerance range will then be frequently assessed as being excessive when a check is made by reference to the tolerance marks. It is better to provide a supplementary pair of marks from the spectral curve of the standard color by a simultaneous change in concentration of both the yellow and the red dye. This will be explained in greater detail.

The same colored solution was used as above. The variations in concentration which determine the spacing of the pair of marks from the spectral transmission curve of the standard color were 1.15 mg./l. for the yellow, 0.35 mg./l. for the purple and 2.5 mg./l. for the gray. A wave length of 460 m$\mu$ was selected for the supplementary pair of marks. If the concentration of the yellow and purple are both reduced by 70% of the amounts of the two dyes, i.e. by 0.81 mg./l. for the yellow and by 0.25 mg./l. for the purple, then a color difference of $\Delta E = 3.0$ MacAdam units from the standard is obtained. The upper mark is then at $\tau = 21.3\%$, the lower mark at $\tau = 19.7\%$ (the transmittance of the standard color at 460 m$\mu$ is 20.5%).

The supplementary pair of marks prevents the fixed color difference from being substantially exceeded. An accurate check proved that several upper tolerance marks can be simultaneously reached in only six cases. The differences in these six cases were determined. The results are collated in the following table:

| No. | Color change due to— | Tolerance marks reached at— | $\Delta E$ |
|---|---|---|---|
| 1 | Reduction of yellow and purple | 420 and 460 m$\mu$ | 3.2 |
| 2 | do | 460 and 510 m$\mu$ | 3.1 |
| 3 | Reduction of yellow and gray | 420 and 460 m$\mu$ | 2.8 |
| 4 | do | 460 and 600 m$\mu$ | 3.0 |
| 5 | Reduction of purple and gray | 460 and 510 m$\mu$ | 2.8 |
| 6 | do | 460 and 600 m$\mu$ | 3.1 |

It will be understood from this table that the $\Delta E$ values are all close to the required 3.0 value and that the introduction of the pair of supplementary tolerance marks has therefore substantially improved the accuracy of the method.

In the majority of cases in actual practice colors have a tendency gradually to "migrate" in a particular direction, the reflection or transmission curves rising or falling in the whole spectral range, though to different extents. For instance, exhaustion of the dye liquor results in the transmission curves rising. If the temperatures during a dyeing operation are varied, if the period of action of the dye liquor or of the rinsing bath are changed, the rate of acceptance may be affected and this may be different for the different dyes though the change is in the same direction. In the case of sheeting or glass fluctuations in layer thickness may be responsible for increasing or diminishing transparence and again the effect will affect all the dyes in the same direction.

However, cases do arise in which one of the dyes in the dyed product is present in higher and the other in lower concentration than in the standard color. This may happen for example when in a continuous dyeing process steps are taken to compensate the exhaustion of the dye bath by introducing more concentrated dye solutions and this compensation is incomplete, having caused an impoverishment of one or two dyes and an enrichment of others.

When this is the case the spectral reflection or transmission curve of the standard color migrates upwards at the wave length of one pair of tolerance marks and downwards at the wave length of another pair of tolerance marks. It will be readily understood that such changes lead to an inadmissibly high color deviation if the curve shifts to the upper at one wavelength and to the lower tolerance mark at the other wavelength.

Figure 5:
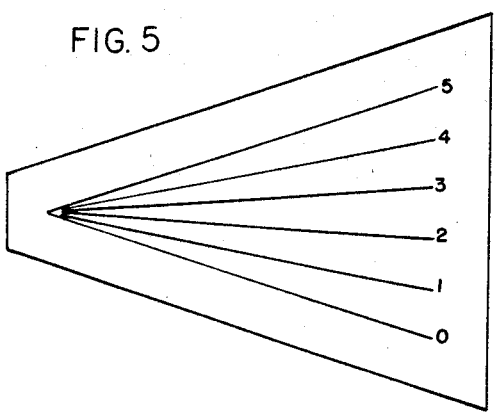

It has been found that even in these cases the tolerance marks can be used, provided the following simple rule is observed: If the curve has shifted in one direction so that the greatest fractional shift towards one tolerance mark is $n$, then it must not be allowed to shift in the other direction by a fraction exceeding $n-1$ towards the other mark. This will be illustrated by an example. Let it be assumed that the pairs of tolerance marks have been determined at three wavelengths. Let it further be assumed that the color change is such that at the first wavelength the upward shift amounts to 60% of the spacing of the mark and at the second wavelength the upward shift is 20% of the difference of the relative mark. At the third mark the change is in the downward direction. Since $n$ at the first wavelength exceeds that at the second wavelength only the greater of the two, namely that at the first wavelength, is taken, and the downward shift to the bottom mark at the third wavelength must therefore not exceed 40% of the difference of this mark (cf. FIG. 4). The reading of the fraction $n$ can be facilitated by using conventional graphical aids, cf. for instance FIG. 5. In the majority of cases it should be sufficient to divide the distance between the curve of the standard color and each tolerance mark into 4 or 5 equal parts. Sometimes even *one* intermediate division at the halfway point may be sufficient.

In conjunction with Example 1 a calculation was made to find out the $\Delta A$ values that result when the concentrations of the three dyes are so varied that the halfway points of one upper tolerance mark and one lower tolerance mark or the halfway points of two marks in one direction and of one mark in the other direction are reached. The results of this computation are collated in the following table:

| No. | Color change due to— | Halfway point towards tolerance mark reached at— | $\Delta A$ |
|---|---|---|---|
| 15 | Reduction of yellow | 420 m$\mu$ up | 2.5 |
|    | Increase of red | 510 m$\mu$ down | |
| 16 | Reduction of yellow | 420 m$\mu$ up | 2.7 |
|    | Increase of blue | 610 m$\mu$ down | |
| 17 | Reduction of yellow | 420 m$\mu$ up | 2.9 |
|    | Increase of red and blue | 510 and 610 m$\mu$ down | |
| 18 | Reduction of red | 510 m$\mu$ up | 2.8 |
|    | Increase of yellow | 420 m$\mu$ down | |
| 19 | Reduction of red | 510 m$\mu$ up | 2.8 |
|    | Increase of blue | 610 m$\mu$ down | |
| 20 | Reduction of red | 510 m$\mu$ up | 3.4 |
|    | Increase of yellow and blue | 420 and 610 m$\mu$ down | |
| 21 | Reduction of blue | 610 m$\mu$ up | 2.6 |
|    | Increase of yellow | 420 m$\mu$ down | |
| 22 | Reduction of blue | 610 m$\mu$ up | 2.9 |
|    | Increase of red | 510 m$\mu$ down | |
| 23 | Reduction of blue | 610 m$\mu$ up | 3.1 |
|    | Increase of yellow and red | 420 and 510 m$\mu$ down | |
| 24 | Reduction of yellow and red | 420 and 510 m$\mu$ up | 3.2 |
|    | Increase of blue | 610 m$\mu$ down | |
| 25 | Reduction of yellow and blue | 420 and 610 m$\mu$ up | 3.5 |
|    | Increase of red | 510 m$\mu$ down | |
| 26 | Reduction of red and blue | 510 and 610 m$\mu$ up | 2.8 |
|    | Increase of yellow | 420 m$\mu$ down | |

It will be seen that the deviations from the 3.0 value are a little wider than when concentrations change in the same direction, as described in Example 1, but for all practical purposes they are still entirely within acceptable limits.

In the several examples it had been assumed that a perceptual color difference of $\Delta A = 3$ according to Simon and Goodwin is the standard for deviation tolerances. It will naturally be understood that this value is by no means a binding standard and smaller or larger values can be taken according to the particular requirements of the case. Moreover, it is by no means necessary to use the Simon and Goodwin system of evaluation and other formulae for evaluating the perceptual size of color differences could be referred to, such as the formula by Judd and Hunter in D. B. Judd and G. Wyszecki "Color in business, Science and Industry," 2nd edition 1963, page 294, second half.

Figure 6:
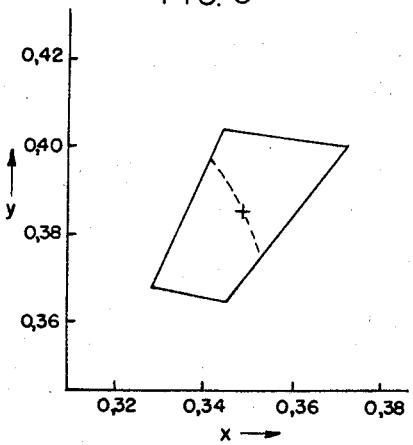

In the introduction it has already been mentioned that in some instances the tolerance limits of colors have already been laid down in colorimetric data. This applies for instance to traffic signals and to some extent also to colors of uniforms and the like. The described method can also be adapted to these demands. Assuming that the tolerance limits are fixed by the quadrilateral shown in FIG. 6 in the C.I.E. chromaticity diagram and determined by the limits $Y_1$ and $Y_2$ of the lightness reference value. By purely empirical trial and error or with the aid of a recipe computation a color is prepared which is roughly in the center of the quadrilateral with a lightness reference value approximately midway between $Y_1$ and $Y_2$. This problem should also be solved if the hitherto conventional method has been used because one should know whether a slight change in the dyeing process will not cause the color to migrate outside the tolerance region. In the conventional method each new dyeing or—in the case of a continuous dyeing process—dyeing samples taken at given intervals must be colorimetrically checked to make sure that they are still within the prescribed limits. Although in the proposed method some preparatory work is needed the actual check is thereafter much simpler and could even be automated by the provision of signalling equipment or control means because only the change in reflection need be measured at two, three or four wavelengths. The preparatory work consists, as described in the examples, in changing the concentration of one dye at a time, upwards and downwards, in steps. The change in concentration of any one of the dyes (cf. FIG. 6) will then be represented by a curve in the chromaticity diagram which intersects the quadrilateral at 2 points. These two points represent the concentration change that can just be tolerated and therefore corresponds to a pair of tolerance marks in the spectral curve. The concentrations of the other dyes are similarly changed. Sometimes it may be found that the tolerance limits of the lightness reference value are exceeded or not attained. In such a case these concentration differences will determine the tolerance marks.

Alternatively for determining the position of the tolerance marks a purely visual assessment could be made instead of making difference evaluations or determining colorimetric limits. As described in the examples and in the preceding section the preparatory work consists in making a number of concentration changes of each component dye upwards or downwards in a standard dye mixture. A careful visual assessment can then be made by several persons, possibly the maker and the customer, to determine the deviations that can be tolerated. Spectrophotometric measurements are then made of the standard dye mixture and the selected limit colors and the tolerance marks are thus ascertained. Although this also involves some preparatory work the uncertainty of continuous visual control which in practise is always the respensibility of a single person is thereby avoided.

With reference to the apparatus required it is not necessary in the last described procedure to perform a complete spectrophotometric measurement of the colors; the determination and checking of the marks in the desired spectral regions can be done with the aid of a conventional filter photometer. If the procedure adopted is as described in the three examples or if reference is made to colorimetrically determined limits, then the fixation of the tolerance marks calls for a spectrophotometric measurement and colorimetric evaluation if the concentration changes are taken into account by computation. In the experimental method the standard color and the modified colors can be determined by the tri-stimulus method and the reflectances in the regions that are of interest measured with filters, this often being feasible in the same instrument. The running check can always be done with a filter photometer and a few filters. A particularly useful instrument is one permitting the values to be linearized, as is the case for instance in the "spectromat" made by Pretema. In such a case it is best to linearize the curve (or only the discrete values that are of interest) of the standard color at a fairly high value say 70 to 80% to ensure that the tolerance marks are at a sufficient distance from the straight line to be easily read.

The activation of signals or of automatic control means is particularly simple if the spectral curve throughout the range wanders only to one side. As has been explained, corrective action is then necessary only when one of the marks is reached. On the other hand, if migration upwards and downwards is likely in different regions then corrective action is not necessary until one upper and one lower intermediate mark are reached.

Automatic control is indicated particularly in continuous dyeing processes. Since the correction does not take effect instantaneously it is advisable to place the tolerance marks a little closer to the values of the standard color, say to correspond with $\Delta A = 2$ instead of $\Delta A = 3$. If the bath contains three dyes control may be so arranged that when any one of the three upper marks is reached the feed of the dye to which the mark relates is started.

As has already been mentioned, it is preferred that the number of tolerance marks should correspond to the number of colorants used, one upper and one lower mark being determined in respect of each. However, the method is by no means restricted to this rule. It has been shown in Example 2 that one of the four pigments used, namely titanium white need not be taken into consideration as a variable colorant because of its very low absorption, so that in this case three pairs of tolerance marks are sufficient. In other cases, too, the number of tolerance marks may be reduced. Experience may show for example that the affinity of one or more dyes is very constant and that the others tend to fluctuate in which case tolerance marks need be determined for these latter dyes only. Alternatively, for reasons of economy it may be advisable to include in a mixture a cheaper and dull colorant together with a brilliant colorant that is more expensive but has roughly the same shade, because the dull colorants alone will not provide the desired color. For example, for producing a particular orange, a brilliant red, a dull yellow and a brilliant yellow are used. In such a case it would be quite enough to determine a pair of tolerance marks for the red in the green region and a single pair of tolerance marks for both yellows in the blue violet region. The necessary corrections are then effected exclusively by means of the red and the brilliant yellow. Conversely, in special circumstances it may be advisable to provide more pairs of marks than there are colorants in the mixture. For instance, a mixture of green and gray may have been prepared in which the absorption of the green is roughly equally strong in the blue and the red regions. Normally only one pair of tolerance marks for the green in the blue or the red region would be provided and a second pair for the gray in the green spectral region. However, if the green varies a little in shade owing to fluctuations in the method of dyeing, or owing to fluctuations in grain size or the like, then it should be best to provide tolerance marks both in the blue and the red regions, that is to say to use three pairs of tolerance marks and thus to ensure a more reliable check.

Sometimes it may also be useful not to provide the tolerance marks above and below the reflexion or transmission curve but instead to select curves that are related to them, such as extinction curves, $K/S$ value curves, curves of logarithmic functions of such quantities or the like. Naturally the conversion of the curves and tolerance marks into such quantities is easily possible and on some instruments it is automatically done. The scope of the invention is therefore understood to embrace these alternatives.

I claim:

1. A method of color control of color mixtures containing a plurality of colorants within predetermined tolerance limits with respect to the standard color of said mixture which comprises measuring the spectral reflection or the spectral transmission of a color mixture at different wave lengths corresponding substantially to the respective wave length of maximum absorption of the individual colorants, predetermining said tolerance limits by determining the amount of permissible tolerance, due to variance of amount of each colorant, to set the tolerance limits by providing small variations of proportion of each colorant and evaluating against the standard color the color difference resulting from said small variations of proportions of each colorant, and establishing the corresponding reflection or transmission tolerance limit above and below the spectral reflection or spectral transmission of said standard color at the wave length corresponding substantially to the maximum absorption of each individual colorant, and maintaining color control of said mixture by measuring the spectral transmission or spectral reflection of compositions colored by said colorants at said wave lengths to determine whether the color of said mixture is within said tolerance limits, said tolerance limits being reached when the greatest fractional deviation toward an upper tolerance limit from the standard plus the greatest fractional deviation toward a lower tolerance limit from the standard is at most unity.

2. A method as claimed in claim 1, wherein said mixture contains as colorants a clear yellow colorant and a clear red colorant and setting an additional pair of tolerance limits at a wave length between the wave lengths of substantially maximum absorption of said yellow colorant and said red colorant, said last-mentioned tolerance limits being determined by evaluating against the standard color small variations of both the yellow and the red colorants.

3. A method as claimed in claim 1, wherein said tolerance limits are determined colorimetrically.

4. A method as claimed in claim 1, wherein said tolerance limits are determined by evaluation by means of a color difference formula.

5. A method as claimed in claim 1, wherein said tolerance limits are determined by visual evaluation of said color differences.

References Cited

UNITED STATES PATENTS

| | | |
|---|---|---|
| 1,540,098 | 6/1925 | Bezzenberger. |
| 1,966,987 | 7/1934 | McCrudden. |
| 2,165,167 | 7/1939 | Hardy. |
| 2,262,573 | 11/1941 | Bender _____ 137—3 |
| 2,656,099 | 10/1953 | Selling _____ 35—28.3 X |
| 2,979,066 | 4/1961 | Christie _____ 137—3 |

EUGENE R. CAPOZIO, Primary Examiner.

H. S. KOGQUIST, Assistant Examiner.

U.S. Cl. X.R.

35—28.3; 106—288, 309; 137—3